United States Patent
Mirakyan et al.

(10) Patent No.: US 9,371,479 B2
(45) Date of Patent: Jun. 21, 2016

(54) CONTROLLED RELEASE BIOCIDES IN OILFIELD APPLICATIONS

(75) Inventors: Andrey Mirakyan, Katy, TX (US); Richard D. Hutchins, Sugar Land, TX (US); Don Williamson, Katy, TX (US); Eric Clum, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 538 days.

(21) Appl. No.: 13/421,076

(22) Filed: Mar. 15, 2012

(65) Prior Publication Data

US 2012/0285693 A1 Nov. 15, 2012

Related U.S. Application Data

(60) Provisional application No. 61/453,243, filed on Mar. 16, 2011.

(51) Int. Cl.
*E21B 43/267* (2006.01)
*C09K 8/68* (2006.01)
*C09K 8/60* (2006.01)
*C09K 8/92* (2006.01)

(52) U.S. Cl.
CPC . *C09K 8/605* (2013.01); *C09K 8/92* (2013.01); *C09K 8/68* (2013.01); *C09K 2208/30* (2013.01); *E21B 43/267* (2013.01)

(58) Field of Classification Search
CPC ........ C09K 8/68; C09K 2208/30; C09K 8/80; E21B 43/26; E21B 43/267
See application file for complete search history.

(56) References Cited

U.S. PATENT DOCUMENTS

| | | |
|---|---|---|
| 4,986,354 A | 1/1991 | Cantu et al. |
| 5,373,901 A | 12/1994 | Norman et al. |
| 5,579,844 A | 12/1996 | Rebardi et al. |
| 5,609,204 A | 3/1997 | Rebardi et al. |
| 5,922,652 A | 7/1999 | Kowalski et al. |
| 5,981,446 A | 11/1999 | Qiu et al. |
| 5,988,285 A | 11/1999 | Tucker et al. |
| 6,001,158 A | 12/1999 | Elphingstone et al. |
| 6,209,643 B1 | 4/2001 | Nguyen et al. |
| 6,444,316 B1 | 9/2002 | Reddy et al. |
| 6,482,866 B1 | 11/2002 | Dahayanake et al. |

(Continued)

FOREIGN PATENT DOCUMENTS

| | | |
|---|---|---|
| CA | 2829759 A1 | 9/2012 |
| GB | 2145708 A | 4/1985 |

(Continued)

OTHER PUBLICATIONS

"Software estimates chemical, physical properties", Chemical and Engineering News, vol. 63(5), Feb. 4, 1985, p. 27.

(Continued)

*Primary Examiner* — Zakiya W Bates
(74) *Attorney, Agent, or Firm* — Jeffrey R. Anderson; Rachel Greene; Tim Curington

(57) ABSTRACT

A method for treating a subterranean formation penetrated by a wellbore, the method including the introduction of a well treatment fluid containing at least an encapsulated biocide. Once the encapsulated biocide is introduced and after a predetermined period of time, a biocide is released from an encapsulation material and treats the wellbore and the subterranean formation.

22 Claims, 3 Drawing Sheets

(56) References Cited

U.S. PATENT DOCUMENTS

| | | | |
|---|---|---|---|
| 6,527,051 | B1 | 3/2003 | Reddy et al. |
| 6,554,071 | B1 | 4/2003 | Crook et al. |
| 6,703,352 | B2 | 3/2004 | Dahayanake et al. |
| 7,256,160 | B2 | 8/2007 | Crews |
| 7,497,263 | B2 | 3/2009 | Parris et al. |
| 7,968,501 | B2 | 6/2011 | Parris |
| 2003/0196808 | A1 | 10/2003 | Blauch et al. |
| 2003/0228373 | A1 | 12/2003 | Ludensky et al. |
| 2004/0022874 | A1 | 2/2004 | Nalepa et al. |
| 2005/0028976 | A1 | 2/2005 | Nguyen |
| 2005/0287323 | A1 | 12/2005 | Akiyama et al. |
| 2006/0180310 | A1 | 8/2006 | Welton et al. |
| 2008/0004189 | A1 | 1/2008 | Smith et al. |
| 2010/0190666 | A1 | 7/2010 | Ali et al. |
| 2010/0288495 | A1* | 11/2010 | Willberg et al. ............ 166/278 |
| 2010/0307757 | A1 | 12/2010 | Blow et al. |
| 2011/0036583 | A1* | 2/2011 | Willberg et al. .......... 166/308.1 |
| 2012/0015852 | A1* | 1/2012 | Quintero et al. ............ 507/112 |
| 2012/0164203 | A1* | 6/2012 | Premachandran et al. ... 424/408 |
| 2012/0285693 | A1 | 11/2012 | Mirakyan et al. |

FOREIGN PATENT DOCUMENTS

| | | |
|---|---|---|
| GB | 2178960 A | 2/1987 |
| GB | 2182563 A | 5/1987 |
| GB | 2201592 A | 9/1988 |
| GB | 2205310 A | 12/1988 |
| WO | 9322537 | 11/1993 |
| WO | 0194744 A1 | 12/2001 |
| WO | 03106809 A1 | 12/2003 |
| WO | 2010148158 A1 | 12/2010 |
| WO | 2012125890 A2 | 9/2012 |

OTHER PUBLICATIONS

Kirk, et al., "Nuts", Encyclopedia of Chemical Technology, Third Edition, John Wiley & Sons: New York, vol. 16, 1981, pp. 248-276.

Rimassa, et al., "Case Study: Evaluation of an Oxidative Biocide During and After a Hydraulic Fracturing Job in the Marcellus Shale", SPE 141211—SPE International Symposium on Oilfield Chemistry, The Woodlands, Texas, Apr. 11-13, 2011, 10 pages.

Office Action issued in RU2013146024 on Nov. 10, 2014, 7 pages.

Examiner's Report issued in CA2829759 on Nov. 13, 2014, 5 pages.

International Search Report and Written Opinion issued in PCT/US2012/02935 on Oct. 25, 2012, 11 pages.

Office Action issued in related MX application MX/a/2013/010425 on Oct. 2, 2015, 6 pages.

Preliminary Conclusion issued in RU application 2013146024 on Jun. 3, 2015, 3 pages.

Decision on Grant issued in Russian Patent Appl. No. 2013146024/03 on Jan. 11, 2016; 13 pages (w/ English Translation).

* cited by examiner

CONTROLLED RELEASE BIOCIDES IN OILFIELD APPLICATIONS

CROSS-REFERENCE TO RELATED APPLICATIONS

The present application claims priority to U.S. Provisional Patent Application No. 61/453,243, filed Mar. 16, 2011, the disclosure of which is incorporated by reference herein in its entirety.

TECHNICAL FIELD

This present disclosure relates generally to the field of biocides for oilfield application, and relates more particularly, but not by way of limitation, to methods of controlling the release of biocides in various oilfield applications.

BACKGROUND

To enhance or increase the production of oil and gas hydrocarbons from wells bored into subterranean-formations, it has been common practice to pump a viscous fluid at high pressure down into the well bore to crack the formation and force the fracturing fluid into those cracks. The fracturing fluid is also used to carry sand or other types of particles, called proppants, to hold the cracks open when the pressure is relieved. The cracks held open by the proppant provide additional paths for the hydrocarbons, such as oil or natural gas, to reach the wellbore, which, in turn, increases the production of oil and/or natural gas from the well.

However, while recovering these hydrocarbons, the process of water flooding is used in the petroleum industry to increase the recovery of oil. This process increases the total yield of oil present in a formation beyond what is usually recovered in the primary process. It is desirable in this process to maintain a high rate of water injection with a minimum expenditure of energy. Any impediment to the free entry of water to oil-bearing formations seriously reduces the efficiency of the recovery operation.

However, water flooding systems provide an ideal environment for growth and proliferation of biofilms due to the large amount of water being transported through these systems and injected into oil bearing formations in an effort to maintain reservoir pressure and/or to increase the mobility of oil through the formation to producing wells. The large surface area of the water distribution network encourages biofouling, which is the attachment and growth of microbes and/or bacteria on the pipe walls.

Biofouling caused by anaerobic bacteria is compounded in water floods by the practice of removing oxygen from the water before injection. The removal of oxygen is done to minimize corrosion of equipment; however, the anoxic conditions provide an ideal environment for the growth of sulfate reducing bacteria (SRB) in the biofilms. This phenomenon is observed both on the injection side and producing side of the water flood operation. The metabolic activity of these bacteria can lead to accelerated corrosion rates, plugging of filters, health hazards from the sulfide production, and eventual souring of the formation (a sour well contains hydrogen sulfide).

One method to control biofouling is to apply a biocide. The biocide is generally selected based on its performance in a standard laboratory evaluation test. However, the present application is directed to an encapsulated biocide. Prior to the present application, non-encapsulated biocides possessed multiple short comings. For example, non-encapsulated biocides, when released or pumped into the wellbore, may possess a foul odor. Furthermore, once a non-encapsulated biocide is placed into the wellbore, the biocide may potentially react with other components, such as friction reducers and other additives, in the wellbore fluid. Additionally, non-encapsulated biocides are often in liquid form and thus must be pumped with suitable equipment by personnel on the wellbore site, which inherently possesses numerous health, safety and/or environmental concerns.

SUMMARY OF THE DISCLOSURE

There is a need, addressed by the subject matter described herein, for methods of treating a subterranean formation. The above application thus addresses this need by encapsulating a biocide for various oilfield applications. Biocides have a low dosage rate making their addition as solids a very attractive method of application. An alternative method of application is to slurry the solid particles and pump the slurry, which is not noxious due to the encapsulating material. By encapsulating liquid biocides, the ease of use is improved. The purpose of the biocide can vary, depending upon the circumstances and the fluids. For slickwater hydraulic fracturing, the major purpose is to prevent the growth of sulfate reducing bacteria (SRB) that can sour a gas reservoir. For other hydraulic fracturing applications using linear and crosslinked polymers, the biocide can also be effective in preventing thermal degradation.

As described herein below, the main advantages of encapsulated biocides include (1) reducing the exposure of personnel on the surface of the wellbore to harmful chemicals, (2) delaying the release of the biocide, which allows a higher loading of oxidative biocides that can react with gelling agents and other ingredients in the injected fluid, (3) allowing delivery of naturally liquid biocide in a solid form, (4) eliminating noxious odors that permeate the well site and equipment, and (5) preventing reactive interactions with other active additives in the wellbore.

The above and other issues are addressed by the present application, wherein in embodiments, the application relates to a method for treating a subterranean formation penetrated by a wellbore, the method comprising: introducing a well treatment fluid comprised of at least an encapsulated biocide, wherein upon the introduction of the encapsulated biocide and after a predetermined period of time, a biocide is released from an encapsulation material and treats the wellbore and the subterranean formation.

In embodiments, described herein is a method for treating a subterranean formation penetrated by a wellbore, the method comprising: introducing a well treatment fluid comprised of at least an encapsulated biocide and a hydratable polymer, wherein upon the introduction of encapsulated biocide and after a predetermined period of time, a biocide is released from an encapsulation material and treats the subterranean formation.

In embodiments, described herein is a method for hydraulic fracturing a subterranean formation penetrated by a horizontal wellbore, the method comprising: isolating at least a portion of the horizontal wellbore, and introducing a well treatment fluid comprised of at least an encapsulated biocide and water, wherein upon the introduction of encapsulated biocide and after a predetermined period of time, a biocide is released from an encapsulation material and treats the subterranean formation, and wherein the horizontal wellbore is not flowed back for about 1 day to about 1 year.

BRIEF DESCRIPTIONS OF DRAWINGS

DETAILED DESCRIPTION

Figure 1:
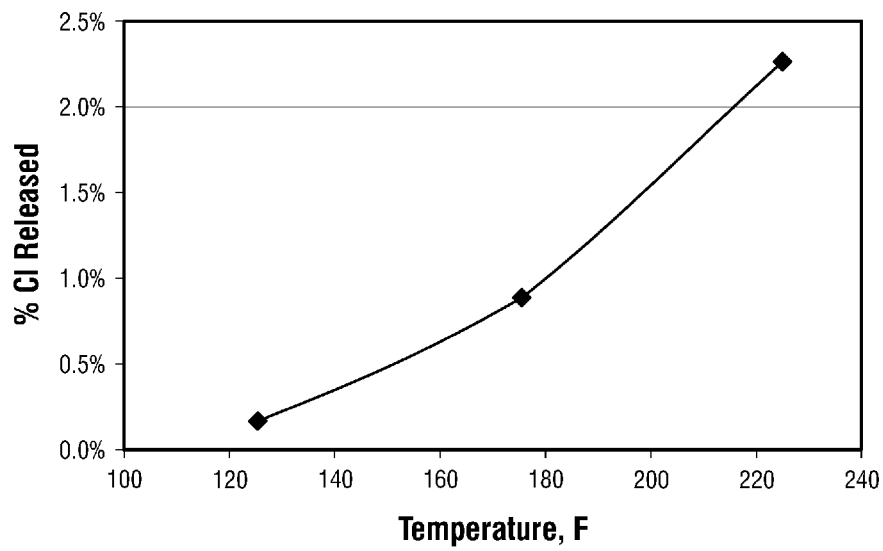
FIG. 1 represents the delayed release profile of chlorine from encapsulated trichloroisocyanuric acid after 1 hour of exposure at various temperatures.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the presently claimed subject matter.

As used in the specification and claims, "near" is inclusive of "at."

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "horizontal wellbore" refers to wells that are substantially drilled through a subterranean zone to maximize the exposure to the zone. For zones which are primarily horizontal, the wellbore may have a deviation from the vertical of 80 to 110 degrees in the productive zone of interest. For those zones that have an inclination from the horizontal, the wellbore will primarily be drilled at an angle to keep the wellbore within the zone. Horizontal wellbores are typically vertical near the surface and incline to a direction substantially parallel to the bedding planes of the zone into which the wellbore is placed. Often in shales and low permeability formations, multiple hydraulic fractures are placed along the length of this wellbore to maximize contact between the formation and the wellbore. Fractures are normally done starting at the toe of the well and suitable means are employed to isolate those fractures before the next fracture is performed. When all fracturing is complete, the isolation mechanism (often referred to as zonal isolation") is removed and all the fractured zones are in hydraulic communication with the wellbore and the surface. Zonal isolation systems are used to isolate and selectively produce oil or gas from separate zones in a single well, which are described in detail in U.S. Pat. Nos. 5,579,844; 5,609,204 and 5,988,285, the disclosures of which are incorporated by reference herein in their entirety. For the extended time to fully complete the well with multiple fractures, the first fractures may be shut-in for several days to several weeks, which provides an environment for microbes to flourish if biocides are not included in the treatment fluid. Traditional biocides do not always have the capability to provide protection for extended time needed in these wells.

The term "fracturing" refers to the process and methods of breaking down a geological formation and creating a fracture, i.e., the rock formation around a wellbore, by pumping fluid at a very high pressure (pressure above the determined closure pressure of the formation), in order to increase production rates from or injection rates into a hydrocarbon reservoir. The fracturing methods otherwise use conventional techniques known in the art.

A "crosslinker" or "crosslinking agent" is a compound mixed with a base-gel fluid to create a viscous gel. Under proper conditions, the crosslinker reacts with a water soluble polymer to couple the molecules, creating a crosslinked polymer fluid of high, but closely controlled, viscosity.

A "fracturing fluid" is often described as a linear gel, a crosslinked gel or a slickwater. Linear and crosslinked gels typically contain 1.2 to 4.8 kg/cubic meter (10 to 40 pounds per thousand gallons) of a biopolymer such as guar or a derivatized guar. Crosslinked fluids have higher viscosity from the effect of the crosslinker. Slickwater is characterized as a water containing small amounts of a drag reducing agent such as polyacrylamide, a micellar solution of viscoelastic surfactants, or a low concentration linear gel which reduces friction by 40 to 80% over that experienced without the drag reducer. This allows the treatment to be pumped at higher rate or lower pressure. Various other additives comprise the fracturing fluid including biocides, scale inhibitors, surfactants, breakers, breaker aids, oxygen scavengers, alcohols, corrosion inhibitors, fluid-loss additives, fibers, proppthermal stabilizers, proppants and the like.

The term "hydraulic fracturing" as used in the present application refers to a technique that involves pumping fluids into a well at pressures and flow rates high enough to split the rock and create opposing cracks extending up to 300 m (1000 feet) or more from either side of the borehole. Later, sand or ceramic particulates, called "proppant," are carried by the fluid to pack the fracture, keeping it open once pumping stops and pressures decline. Complex fractures which include secondary and tertiary fractures connecting to the main fracture can also result from fracturing operations and are dependent upon the formation properties.

As used herein, the new numbering scheme for the Periodic Table Groups are used as in Chemical and Engineering News, 63(5), 27 (1985).

As used herein, the term "liquid composition" or "liquid medium" refers to a material which is liquid under the conditions of use. For example, a liquid medium may refer to water, and/or an organic solvent which is above the freezing point and below the boiling point of the material at a particular pressure. A liquid medium may also refer to a supercritical fluid.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

As used herein, the term "biocide" refers to agents such as germicides, bactericides, disinfectants, sterilizers, preservatives, fungicides, algicides, aquaticides, herbicides, insecticides, larvicides, pesticides, plant growth regulators and the like, each of which may be used for their ability to inhibit growth of and/or destroy various biological and/or microbiological species such as bacteria, fungi, algae, insects, larvae, worms and the like.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Described herein is a method for treating a subterranean formation penetrated by a wellbore, the method comprising: introducing a well treatment fluid comprised of at least an encapsulated biocide, wherein upon the introduction of encapsulated biocide and after a predetermined period of time, a biocide is released from an encapsulation material and treats the subterranean formation.

Biocide

In embodiments, the wellbore fluid described herein includes at least one encapsulated biocide.

Microbes have long been a problem in the oilfield. In particular, sulfate reducing bacteria (SRB) have led to souring of reservoirs which results in excessive corrosion of wellbore tubulars, downhole and surface equipment as well as health issues from the presence of hydrogen sulfide. Wells having hydrogen sulfide release at the surface require special notification handling and procedures during operations, enhanced personnel training, and the availability of self contained breathing apparatus while working near the well. Microbes can also cause formation damage and restrict productivity by formation of biofilms. Acid-producing bacteria (APB) also contribute to corrosion and fouling of surface equipment, and they also can impede production. These species of bacteria have been found to exist in anaerobic conditions that exist downhole and need to be controlled to minimize production impairment, extend the life of well and surface equipment, prevent reservoir souring, and eliminate health issues for personnel.

Common biocides used for treating surface fluids prior to injection must be carefully selected to balance several objectives. The biocide should offer a "quick kill" to prevent injection of live microbes into the well and allow sampling to confirm the greatly reduced levels of microbes that may exist in the injection fluid after treatment. The biocide should not interfere with the treatment chemicals and should not be a health risk. Noxious odors are present with many biocides and their elimination is beneficial. None of the known biocides can provide all of these elements for slickwater or gelled fluids commonly used in fracturing. With slickwater fracturing methods, the friction reducers are often considered to be sensitive to many of the biocides. Glutaraldehyde is one of the more popular biocides for slickwater applications because it does not neutralize the effect of the friction reducer. Yet, it is very noxious at the surface. A need exists for a biocide that can be encapsulated, entrapped or coated to prevent interactions with chemicals and personnel at the surface, while also allowing for a long and/or delayed release period downhole to provide continuous microbial control after the treatment and during well flowback. See Rimassa et al., Case Study: Evaluation of an Oxidative Biocide During and After a Hydraulic Fracturing Job in the Marcellus Shale, SPE 14121, which discusses some of these issues and is incorporated by reference herein in its entirety.

Biocides may be used in oilfield applications to eliminate any number of living organisms, such as bacteria, from mix water. Furthermore, biocides may include a basic to acidic pH range bactericide, fungicide, algaecide, and/or preservative. The biocide may thus be effective and function at a pH of from about 2 to about 14, in embodiments from about 4 to about 11.

Any material that directly functions or inherently functions as a biocide may be used in the wellbore fluid of the present application, such as biocides having a solubility in water of less than about 10 g/L at 20° C. and 1 atm, such as, for example, from about 0.1 g/L to about 10 g/L, from about 0.2 g/L to about 5 g/L, from about 0.2 g/L to about 3 g/L and from about 0.2 g/L to about 2 g/L, each of solubilities being determined at 20° C. and 1 atm.

Examples of suitable biocides may include: both so-called non-oxidizing and oxidizing biocides. Examples of commonly available oxidizing biocides include hypochlorite bleach, such as calcium hypochlorite and lithium hypochlorite, peracetic acid, potassium monopersulfate, potassium peroxymonosulfate marketed under the tradenames Oxone (DuPont) and Caroat (Evonik), bromochlorodimethylhydantoin, dichloroethylmethylhydantoin, chloroisocyanurate, trichloroisocyanuric acids and dichloroisocyanuric acids and salts thereof, or chlorinated hydantoins. Suitable oxidizing biocides can also include, for example bromine products like: stabilized sodium hypobromite, activated sodium bromide, or brominated hydantoins. Suitable oxidizing biocides can also include, for example chlorine dioxide, ozone, inorganic persulfates such as ammonium persulfate, or peroxides, such as hydrogen peroxide and organic peroxides.

Examples of commonly available non-oxidizing biocides may include dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl)phosphonium sulfate, glutaraldehyde, alkyldimethylbenzyl ammonium chloride, didecyldimethylammonium chloride, poly[oxyethylene-(dimethyliminio)ethylene(dimethyliminio)ethylene dichloride], decylthioethanamine, and terbuthylazine.

Additional types of non-oxidizing biocides are quaternary ammonium salts, aldehydes and quaternary phosphonium salts. The typical quaternary biocide has one fatty alkyl group and three methyl groups, but in the case of phosphonium salts the methyl groups can be substituted by hydroxymethyl groups without substantially affecting the biocidal activity. They may also be substituted by at least one aryl group e.g. the benzalkonium salts, without loss of either surfactancy or biocidal activity. Examples include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride (ADBAC), cocodiamine, dazomet such as Protectol DZ from BASF, 1-(3-chloroallyl)-chloride.3,5,7-triaza-1-azoniaadamantane (CTAC or Quaternium-15), and mixtures of two or more thereof.

As discussed above, quaternary phosphonium salts such as, for example, tetrakis(hydroxymethyl)phosphonium salt (herein referred to as "THPS") salts and tris hydroxymethyl phosphine may also be used as a biocide. THPS is further described in detail in GB 2145708, GB-A-2178960, GB-A-2182563, GB-A-2201592 and GB-A-2205310, the disclosures of which are incorporated by reference in their entirety. Additional examples include alkyl phosphonium salts such as, for example, tributyltetradecyl phosphonium chloride (TTPC).

Additional examples of non-oxidizing biocides also include isothiazolinone biocides such as, for example, 5-chloro-2-methyl-4-isothiazolin-3-one ("CIT"), 2-methyl-4-isothiazolin-3-one ("MIT"), 1,2-benzisothiazolin-3-one ("BIT") combinations thereof, and the like. CIT, MIT and/or BIT are often referred to as broad spectrum non-oxidizing, non-toxic isothiazolinone biocides.

Additional examples of non-oxidizing biocides include amine-type compounds, such as, for example, quaternary amine compounds; halogenated compounds, such as, for example, 2-bromo-2-nitro-1,3-propanediol (also referred to as bronopol) and 2-2-dibromo-3-nitrilopropionamide (DBNPA)), tris(hydroxymethyl)nitromethane (THNM), 5-bromo-5-nitro-1,3-dioxane; sulfur compounds, such as, for example, isothiazolone, carbamates, and metronidazole).

Additional examples of oxidizing and non-oxidizing biocides include triazines such as 1,3,5-tris-(2-hydroxyethyl)-s-triazine and trimethyl-1,3,5-triazine-1,3,5-triethanol, an example being GROTAN by Troy Corporation, iodopropynylbutylcarbamate, such as POLYPHASE supplied by Troy Corporation, 4,4-dimethyloxazolidine, an example being BIOBAN CS-1135 from The Dow Chemical Company, 7-ethyl bicyclooxazolidine, marketed as BIOBAN CS-1246 by The Dow Chemical Co., a combination of 4-(2-nitrobutyl)-morpholine with 4,4'-(2-ethyl-2-nitrotrimethylene)dimorpholine, marketed as FUELSAVER by The Dow Chemical Co., a combination of 5-chloro-2-methyl-4-isothiazolin-3-one with 2-methyl-4-isothiazolin-3-one, such as the KATHON brand supplied by Rohm & Haas Corporation, octylisothiazolinone, dichloro-octylisothiazolinone, dibromo-octylisothiazolinone, phenolics such as o-phenylphenol and p-chloro-m-cresol and their corresponding sodium and/or potassium salts, sodium pyrithione, zinc pyrithione, n-butyl benzisothiazolinone, 1-(3-chloroallyl)-3,5,7-triaza-1-azoniaadamantane chloride, chlorothalonil, carbendazim, diiodomethyltolylsulfone, N,N'-Methylene-bis-morpholine, ethylenedioxy methanol (e.g. Troyshield B7), phenoxyethanol, (e.g. Comtram 121), tetramethylol acetylenediurea (e.g. Protectol TD), dithiocarbamates, 2,6-Dimethyl-m-dioxan-4-ol acetate (e.g Bioban DXN), dimethyloldimethyl-hydantoin, bicyclic oxazolidines (e.g. Nuospet 95), (thiocyanomethylthio)-benzothiazole (TCMTB), methylene bis(thiocyanate (MBT), substituted dioxaborinanes such as BIOBOR JF from Hammonds Fuel Additives.

Additional examples of biocides may be 3-allyloxy-1,2-benzoisothiazol-1,1-dioxide; basic copper chloride; basic copper sulfate; 1,2-benzisothiazoline-3-one; 2-Methyl-4-isothiazoline-3-one; methyl-N-(1H-benzoimidazol-2-yl) carbamate; 2-(tert-butylamino)-4-(cyclopropylamino)-6-(methylthio)-striazine; 2-tert-butylamino-4-ethylamino-6-methylmercapto-s-triazine; S—N-butyl-5'-para-tert-butyl-benzyl-N-3-pyridyldithiocarbonylimidate; 2-chloro-1-(3-ethoxy-4-nitrophenoxy)-4-(trifluoromethyl)benzene; 4-chlorophenoxy-3,3-dimethyl-1-(1H,1,3,4-triazol-1-yl)-2-butanone; α-[2-(4-chlorophenyl)ethyl]-α-(1,1-dimethylethyl)-1H-1,2,4-triazole-1-ethanol; copper 8-quinolinate; cycloheximide; bis-(dimethyldithiocarbamoyl)disulfide; 11-dehydrodibenzo (b,f)azepine; 2,4-dichloro-6-(0-chloroanilino)-1,3,5-triazine; 1,4-dichloro-2,5-dimethoxybenzene; N'-dichlorofluoromethylthio-N,N-dimethyl-N-phenyl sulfamide; 2,3-dichloro-1,4-naphthoquinone; 2,6-dichloro-4-nitroaniline; 4,5-dichloro-2-N-octyl-4-isothiazolin-3-one; N-(3,5-dichlorophenyl)-1,2-dimethylcyclopropane-1,2-dicarboxylmide; N'-(3,4-dichlorophenyl)-N,N-dimethylurea; 1-[2-(2,4-dichlorophenyl)-4-ethyl-1,3-dioxorane-2yl-methyl]-1H-1,2,4-triazol; N-(3,5-dichlorophenyl)succinamide; 1-[[2(2,4-dichlorophenyl)-4-propyl-1,3-dioxolan-2-yl]methyl]1-H-1,2,4-triazole; N-2,3-dichlorophenyltetrachlorophthalamic acid; 3-(3,5-dichlorophenyl)-5-ethenyl-5-methyloxazolizine-2,4-dione; 2,3-dicyano-1,4-dithioanthraquinone; N-(2,6-diethylphenyl)-4-methylphthalimide; N-(2,6-p-diethylphenyl)phthalimide; 5,6-dihydro-2-methyl-1,4-oxathine-3-carboxanilide; 5,6-dihydro-2-methyl-1,4-oxathine-3-carboxanilido-4,4-dioxide; diisopropyl 1,3-dithiolane-2-iridene malonate; N,N-diisoprapyl S-benzylphosphorothioate; 2-dimethylamino-4-methyl-5-N-butyl-6hydroxypyrimidine; diethyl 2-dimethoxyphosphinothioylsulfanylbutanedioate; bis (dimethyldithiocarbamoyl)ethylenediamine; 5-ethoxy-3-trichloromethyl-1,2,4-thiaziazole; ethyl-N-(3-dimethylaminopropyl)thiocarbamate hydrochloride; O-ethyl S,S diphenyldithiophosphate; 3,3'-ethylene-bis-(tetrahydro-4,6-dimethyl-2H-1,3,5-thiadiazine-2thione); 3-hydroxy-5-methylisooxazole; 3-iodo-2-propargyl butyl carbamate; iron methanearsonate; 3'-isopropoxy-2-methylbenzanilide; 1-isopropylcarbamoyl-3-(3,5-dichlorophenyl) hydantoin; kasugamycin; manganese ethylene-bis-(dithiocarbamate); 1,2-bis-(3-methoxycarbonyl-2-thioureido)benzene; methyl-1 (butylcarbamoyl)-2-benzimidazolecarbamate; 5-methyl-10-butoxycarbonylamino-10; 3-methyl-4-chlorobenzthiazol-2-one; methyl-D,L-N-(2,6-dimethylphenyl)-N-(2'-methoxyacetyl)alaninate; S,S-6-methylquinoxaline-2,3-di-yl-dithiocarbonate 5-methyl-s-triazol-(3,4-b)benzthiazole; nickel dimethyldithiocarbamate; 2-octyl-2H-isothiazol-3-one; 2-oxy-3-chloro-1,4-naphthoquinone copper sulfate; pentachloronitrobenzene; (3-phenoxyphenyl)methyl(+/−)-cis,trans-3-(2,2-dichloroethenyl)-2,2-dimethylcyclopropane-carboxylate; polyoxine; potassium N-hydroxymethyl-N-methyldithiocarbamate; N-propyl-N-[2-(2,4,6-trichlorophenoxy)ethyl]imidazol-1-carboxamide; 2-pyridinethiol-1-oxide sodium salt; sodium pyrithione; N-tetrachloroethylthio-4-cyclohexene-1,2-dicarboxylmide; tetrachloroisophthalonitrile; 4,5,6,7-tetrachlorophthalide; 1,2,5,6-tetrahydro-4H-pyrrolol-[3,2,1-i,j]quinoline-2-one; 2-(thiocyanomethylthio)benzothiazole; N-trichloromethylthio 4-cyclohexene-1,2-dicarboxylmide; silver; copper; N-(trichloromethylthio)phthalimide; validamycin; zinc ethylene-bis-(dithiocarbamate); zinc bis-(1-hydroxy-2(1H)pyridinethionate; zinc propylene-bis-(dithiocarbamate); and zinc pyrithione.

Additional examples of biocides are described in U.S. Pat. No. 6,001,158, U.S. Patent Application No. 2008/0004189, U.S. Patent Application Pub. No. 2005/0028976, U.S. Patent Application No. 2005/0287323, U.S. Patent Application Pub. No. 2010/0307757, U.S. Patent Application Pub. No. 2010/

0190666, the disclosure of which are each incorporated by reference herein in their entirety.

As discussed above, the biocide of the present application is encapsulated or entrapped. The biocide or plurality of biocides may be encapsulated or coated by any suitable encapsulation method using any suitable encapsulation material or "shell". The encapsulation material may be any material which does not adversely interact or chemically react with the biocide to destroy its utility. For example, the biocide may be encapsulated by adsorbing the biocide onto an inert carrier and then coating the biocide particle (either partially or entirely) with encapsulant material, as described in WO 2010/1448158 A1, the disclosure of which is incorporated by reference herein in its entirety. Additional examples of encapsulation methodology are described in U.S. Pat. Nos. 5,373,901; 6,444,316; 6,527,051; and 6,554,071, the relevant disclosures of which are incorporated herein by reference in their entirety.

The biocide may also be entrapped in a primarily solid matrix of inert material. Complete coating of a particle may not be required in this case as entrapment slows down the release of the active biocide sufficiently for prolonged antimicrobial activity downhole.

Examples of encapsulation materials may be present as a coating on the outer surface of the biocide, or as multiple layers of coatings, such as an inner and outer coating, on the surface of the biocide or as an inert material in a solid matrix comprising the biocide particles. Examples of suitable encapsulation materials include film-forming polymers such as, amino-based prepolymers such as urea-, melamine-, benzoguanamine-, and glycouril-formaldehyde resins and dimethyloldihydroxyethylene urea type prepolymers. These prepolymers can be used as blends and with polyvinyl alcohol, polyvinyl amines, acrylates (acid functionality preferred), amines, polysaccharides, polyureas/urethanes, poly amino acids, and proteins. Other suitable polymers include polyesters, including biodegradable polyesters, polyamides, polyacrylates and polyacrylamides, polyvinyl polymer and copolymers with polyacrylates, polyurethanes, polyethers, polyureas, polycarbonates, naturally occurring polymers such as, polyanhydrides, polyphosphazines, polyoxazolines, and UV-cured polyolefins.

Specific examples of encapsulation materials include poly (ethylene-maleic anhydride) and polyamine; waxes such as, for example, carbowax, polyvinylpyrrolidone (PVP) and its co-polymers such as polyvinylpyrrolidone-ethyl acrylate (PVP-EA), polyvinylpyrrolidone-vinyl acrylate, polyvinylpyrrolidone methylacrylate (PVP-MA), polyvinylpyrrolidone/vinyl acetate, polyvinyl acetal, polyvinyl butyral, polysiloxane, polypropylene maleic anhydride, maleic anhydride derivatives and co-polymers of the above, e.g. polyvinyl methyl ether/maleic anhydride. Preferably, the inner wall coating comprises polysiloxane, PVP or PVP co-polymers, more preferably PVP or PVP co-polymers, and even more preferably PVP co-polymers, particularly polyvinylpyrrolidone-methyl acrylate or polyvinylpyrrolidone-ethyl acrylate. Additional examples of encapsulation materials include; polyvinyl alcohol (PVOH), PVdC (poly vinylidene chloride), styrene-butadiene latex, gelatin, gum arabic, carboxymethyl cellulose, carboxymethyl hydroxyethyl cellulose, hydroxyethyl cellulose, other modified celluloses such as, hydroxypropylmethylcelluloses, alginates, such as sodium alginate, chitosan, casein, pectin, modified starch, polyvinyl methyl ether/maleic anhydride, poly(vinyl pyrrolidone/dimethylaminoethyl methacrylate) (PVP/DMAEMA) (manufactured as GAFQUAT 755N by ISP Corporation) poly(vinyl pyrrolidone/methacrylamidopropyl trimethyl ammonium chloride) (manufactured as GAFQUAT HS 100 by ISP Corporation), melamine-formaldehyde and urea. The encapsulating material may also be a hydrophobic material such as poly vinylidene chloride (PVdC), lipids, waxes and combinations thereof.

Encapsulated biocide is added to mix water prior to starting the job or on-the-fly during the job. Initially, 0-20% release of biocide from encapsulation may occur upon contact with water. The remaining part of biocide is released within the next few hours, days or months depending on type of coating and BHST. Various types of materials and/or can be used to encapsulate biocides. In another use where the biocide is an aldehyde such as formaldehyde or glutaraldehyde, the encapsulation allows for a delay in reaction with other components used to form a water control gel. Aldehydes also find use in corrosion inhibitor packages and could provide longer life when combined with live aldehydes.

Other methods for encapsulating the biocide can include: (1) spray coating by spraying a melt or solution of encapsulating material into a fluid bed of the biocide particles; (2) spraying the biocide with a wax of a given melting point commensurate with the reservoir temperature; (3) pelletizing the biocide with a binder that breaks apart and releases the biocide; (4) fluidized bed coating such as the Glatt process or Wurster process with appropriate modification for obtaining the desired particle size; and (5) pan coating where the biocide is immersed in a solution in which the polymer or other encapsulating material is dissolved (and the biocide is insoluble) and then dried to form a film or coating on the biocide particles.

The well treatment fluid may also comprise a non-encapsulated biocide, which as used herein refers to a biocide that is not encapsulated or does not contain any encapsulation material. The non-encapsulated biocide may be used in addition to the encapsulated biocide, and may be added to provide the immediate (i.e., non-delayed) microbial control in the wellbore and/or subterranean formation. Suitable examples of the non-encapsulated biocide include any of the known biocide materials described above.

The biocide is released from the encapsulation material in any suitable period or predetermined period of time, such as, for example, greater than or equal to about 1 hour, 4 hours, 5 hours, 6 hours, 12 hours, 18 hours, 1 day, 2 days, 5 days, 1 week, 3 weeks, 1 month, 3 months, 6 months or 1 year.

In embodiments, the encapsulated biocide has a release profile such that the encapsulated biocide provides an initial concentration of biocide capable of obtaining immediate control of microbial growth within the subterranean formation (i.e., at least about 5 to 10 minutes or at least about 30 to 45 minutes) and the wellbore, and also delaying release of the biocide for long term control of the microbial growth. This initial concentration of biocide (although dependent on the specific biocide used) may be in the range of from about 1 to about 1000 mg/L, such as, for example, from about 1 to about 500 mg/L, from about 5 to about 250 mg/L, from about 10 to about 200 mg/L and from about 25 to about 100 mg/L. The release profile refers to the release of the biocide in the wellbore and/or the subterranean formation and is further represented in the figures.

In the present application, the encapsulated biocide (or combination of biocides) may be present in the wellbore composition in an amount of about 0.001 and 2 weight percent, such as from about 0.1 to about 1.75 weight percent, from about 0.5 weight percent to about 1.5 weight percent and from about 0.75 weight percent to about 1 weight percent, based on the total weight of the wellbore composition.

In certain embodiments of the present application, the well treatment fluid comprises at least one polymer (also referred to as a "viscosifier") and in some embodiments at least one crosslinker, the polymer and crosslinker reacting under proper conditions to form a crosslinked polymer. The polymer should not prematurely crosslink before the desired set time. The polymer may be a hydratable polymer, such as a polysaccharide or polyacrylamide.

The hydratable polymer may be a high molecular weight water-soluble polysaccharide containing cis-hydroxyl groups that can complex the crosslinking agent. Without limitation, suitable polysaccharides include those polysaccharides having a molecular weight in the range of about 200,000 to about 10,000,000 Daltons, such as, for example, from about 500,000 to about 2,500,000 Daltons and from about 1,500,000 to about 2,500,000 Daltons.

Polysaccharides having cis-hydroxyl groups for the purposes of the present application include such polysaccharides as the galactomannans. The term galactomannans refers in various aspects to naturally occurring polysaccharides derived from various endosperms of seeds. They are primarily composed of D-mannose and D-galactose units. They generally have similar physical properties, such as being soluble in water to form thick, highly viscous solutions which usually can be gelled (crosslinked) by the addition of such inorganic salts as borax. Examples of some plants producing seeds containing galactomannan gums include Tara, Huizache, locust bean, Palo Verde, Flame tree, guar bean plant, Honey locust, Lucerne, Kentucky coffee bean, Japanese pagoda tree, Indigo, Jenna, Rattlehox, Clover, Fenergruk seeds and soy bean hulls. The gum is provided in a convenient particulate form, wherein examples of polysaccharide include guar and its derivatives. These include guar gum, carboxymethylguar, hydroxyethylguar, carboxymethylhydroxyethylguar, hydroxypropylguar (HPG), carboxymethylhydroxypropylguar (CMHPG), and combinations thereof. As a galactomannan, guar gum is a branched copolymer containing a mannose backbone with galactose branches.

As discussed above, some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used, and have been shown to be useful as viscosifying agents as well. Biopolymers such as xanthan, diutan, whelan gum and scleroglucan may also be used. Synthetic polymers such as polyacrylamide, copolymers or terpolymers containing acrylamide, acrylate, vinyl pyrrolidone and/or acrylamido propane sulfonic acid, polyacrylate polymers, as well as diutans, may be useful for high-temperature applications. Additional examples of suitable polymers are described in U.S. Pat. No. 5,981,446, U.S. Pat. No. 7,497,263 and U.S. Pat. No. 7,968,501, the disclosures of which are incorporated by reference herein in their entirety.

The polymer may be present in the wellbore fluid in an amount of from about 0.005 weight percent to about 10 weight percent, from about 0.01 weight percent to about 5 weight percent, from about 0.02 weight percent to about 2 weight percent and from about 0.02 weight percent to about 0.5 weight percent, based upon the total weight of the wellbore fluid.

The well treatment fluid may also include a suitable crosslinking agent that is effective at crosslinking the hydratable polymer substantially without prolonged mixing operations above ground. Examples of crosslinker include zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); boron compounds (such as, for example, ulexite or colemanite); iron compounds; copper compounds; zinc compounds; or a combination thereof. Suitable crosslinkers generally are added to fracturing fluids in an amount sufficient to provide, among other things, the desired degree of crosslinking between hydratable polymer molecules.

In embodiments, the crosslinkers may be present in the wellbore fluid in an amount in the range from about 0.001% to about 10% by weight. In other embodiments of the present application, the crosslinkers may be used in an amount in the range from about 0.01% to about 1% by weight of the water therein.

The wellbore fluid of the present application may also include additional constituents or material, such as water. One additional material that may be included is oxidative breaker. The purpose of this material is to "break" or diminish the viscosity of the crosslinked fluid so that this fluid is more easily recovered from the formation during cleanup. The breaker degrades the crosslinked polymer to reduce its molecular weight. If the polymer is a polysaccharide, the breaker may be a peroxide with oxygen-oxygen single bonds in the molecular structure. These peroxide breakers may be hydrogen peroxide or other material such as a metal peroxide that provides peroxide or hydrogen peroxide for reaction in solution. A peroxide breaker may be a so-called stabilized peroxide breaker in which hydrogen peroxide is bound or inhibited by another compound or molecule(s) prior to its addition to water but is released into solution when added to water. Organic peroxides can also be employed.

Some fluids according to the present application may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference in their entirety, are also suitable for use in wellbore fluids.

In some embodiments, the surfactant may be an ionic surfactant. Examples of suitable ionic surfactants include anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include surfactants that are usually regarded as zwitterionic surfactants, and in some cases as amphoteric surfactants, such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution AQUAT 944 (available from Baker Petrolite of 12645 W. Airport Blvd, Sugar Land, Tex. 77478 USA). In other embodiments, the surfactant may be a blend of two or more of the surfactants described above, or a blend of any of the surfactant or surfactants described above with one or more nonionic surfactants. Examples of suitable nonionic surfactants include alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in the wellbore fluid. These fluids may incorporate the surfactant or blend of surfactants in an amount of about 0.02 wt % to about 5 wt % of total liquid phase weight, or from about 0.05 wt % to about 2 wt % of total liquid phase weight.

Other materials which may be included in a wellbore fluid include electrolyte, such as an organic or inorganic salt, friction reducers to assist flow when pumping and surfactants.

A wellbore fluid may be a so-called energized fluid formed by injecting gas (most commonly nitrogen, carbon dioxide or mixture of them) into the wellbore concomitantly with the aqueous solution. Dispersion of the gas into the base fluid in the form of bubbles increases the viscosity of such fluid and impacts positively its performance, particularly its ability to effectively induce hydraulic fracturing of the formation, and capacity to carry solids. The presence of the gas also enhances the flowback of the fluid when this is required. In a method of this application the wellbore fluid may serve as a fracturing fluid or gravel packing fluid and may be used to suspend a particulate material for transport down wellbore. This material may in particular be a proppant used in hydraulic fracturing or gravel used to form a gravel pack. The most common material used as proppant or gravel is sand of selected size but ceramic particles and a number of other materials are known for this purpose.

Wellbore fluids in accordance with this application may also be used without suspended proppant in the initial stage of hydraulic fracturing. Further applications of wellbore fluids in accordance with this application are in modifying the permeability of subterranean formations, and the placing of plugs to achieve zonal isolation and/or prevent fluid loss.

For some applications a fiber component may be included in the treatment fluid to achieve a variety of properties including improving particle suspension, particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in fluids of the application, the fiber component may be present at concentrations from about 1 to about 15 grams per liter of the liquid phase, in particular the concentration of fibers may be from about 2 to about 12 grams per liter of liquid, and more particularly from about 2 to about 10 grams per liter of liquid.

Friction reducers may also be incorporated into fluids of the application. Any friction reducer may be used. Also, water-soluble friction reducers such as guar gum, guar gum derivatives, polyacrylamide, copolymers and terpolymers containing acrylamide and polyethylene oxide may be used. Embodiments of the present application may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include sand, walnut shells, sintered bauxite, glass beads, ceramic materials, naturally occurring materials, or similar materials. Mixtures of proppants can be used as well. If sand is used, it will typically be from about 20 to about 170 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry and apricot; ground or crushed seed shells of other plants such as various forms of corn (corn cobs or corn kernels); processed wood materials such as those derived from woods such as oak, hickory, walnut, poplar and mahogany, including such woods that have been processed by grinding, chipping, or other form of particalization. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference in its entirety.

The concentration of proppant in the fluid can be any concentration known in the art, and may be in the range of from about 0.03 to about 3 kilograms of proppant added per liter of liquid phase. Also, any of the proppant particles can be further coated with a resin to potentially improve the strength, clustering ability, and flow back properties of the proppant.

The aqueous medium of the present application may be water or brine. In those embodiments, the aqueous medium is a brine, the brine is water comprising an inorganic salt or organic salt. Examples of inorganic salts include alkali metal halides, such as potassium chloride. The carrier brine phase may also comprise an organic salt such as sodium or potassium formate. Preferred inorganic divalent salts include calcium halides, such as, for example, calcium chloride or calcium bromide. Sodium bromide, potassium bromide, or cesium bromide may also be used. The salt is chosen for compatibility reasons, this determination may be based upon the reservoir drilling fluid used a particular brine phase and the completion/clean up fluid brine phase is chosen to have the same brine phase.

Fluid embodiments of the present application may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or the hydratable polymer.

Aqueous fluid embodiments of the present application may also comprise an organoamino compound. Examples of suitable organoamino compounds include tetraethylenepentamine, triethylenetetramine, pentaethylenhexamine, triethanolamine, and the like, or any mixtures thereof. When organoamino compounds are used, they may be incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

The well treatment composition may then be introduced or placed in the wellbore or subterranean formation. As used herein, the term "introducing" or "introduced" refers to mechanism of locating the well treatment composition in the wellbore or subterranean formation by various methods and/or with suitable equipment typically used in various oilfield operations, such as fracturing and cementing. Example "introducing" mechanisms include such as, for example, pumping the well treatment composition within the wellbore. The following examples are presented to illustrate the preparation and properties of aqueous viscoelastic fluids and should not be construed to limit the scope of the application, unless otherwise expressly indicated in the appended claims. All percentages, concentrations, ratios, parts, etc. are by weight unless otherwise noted or apparent from the context of their use. The statements made herein merely provide information related to the present disclosure and may not constitute prior art, and may describe some embodiments illustrating the application.

The horizontal wellbore may not be flowed back for a predetermined period of time, such as, from about 1 day to about 1 year, from about 1 week to about 6 months, from about 2 weeks to about 3 months, and from about 1 month to about 2 months. Flowback means that the plugs separating fracture stages are removed and the well is opened to the surface to allow the fluids in the reservoir to be produced. The initial production includes mostly treatment fluids which then transitions to the reservoir fluids such as oil, gas and/or connate brine. When the well begins producing a predominant amount of reservoir fluids and little or no treatment fluids, the well has "cleaned up" and is put on production with the produced fluid going to sales.

EXAMPLES

Example 1

Delayed Release of Chlorine from Encapsulated Trichloroisocyanuric Acid

Figure 2:
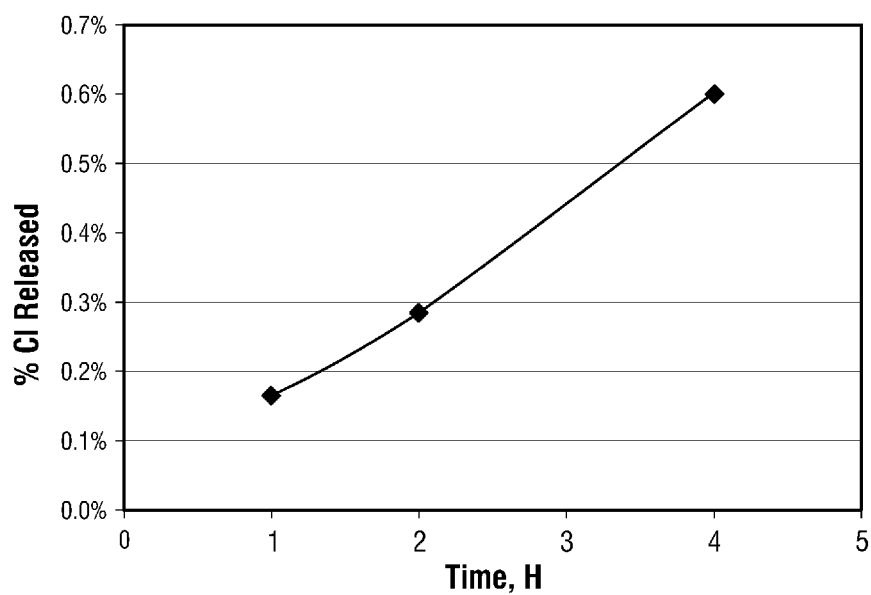
FIG. 2 represents the delayed release profile of chlorine from encapsulated trichloroisocyanuric acid in deionized water at 125° F. (51.6° C.).

A sample of trichloroisocyanuric acid, a well known pool water disinfectant, was encapsulated with PVdC. Active content of the encapsulated chemical was 85%. The following procedure was performed: 0.5 grams of encapsulated trichloroisocyanuric acid along with 15 mL of deionized (DI) water were loaded into a series of 20 mL glass vials. The vials were hermetically sealed and placed in a water bath at various temperatures. After a certain period of time, each vial was removed from the bath, quenched in cold water to reduce the temperature of the vial to room temperature, and then each vial was analyzed for total chlorine content. The data obtained after 1 hour of exposure to the above temperature was plotted to generate the biocide release profile against temperature, as shown as FIG. 1. The data obtained at 125° F. (51.7° C.) and various exposure times was used to generate the release profile, as shown in FIG. 2. HACH test kit catalog number 24711-00 was used to measure total chlorine content.

Example 2

Delayed Release of Ammonium Persulfate from PVdC Encapsulation Material

Ammonium Persulfate (APS) is commonly used as a bleaching agent or disinfectant. A sample of APS coated with poly vinylidene chloride (PVdC) was used in the following example. The core to wall ratio of APS to PVDC was 85% to 15%.

Figure 3:
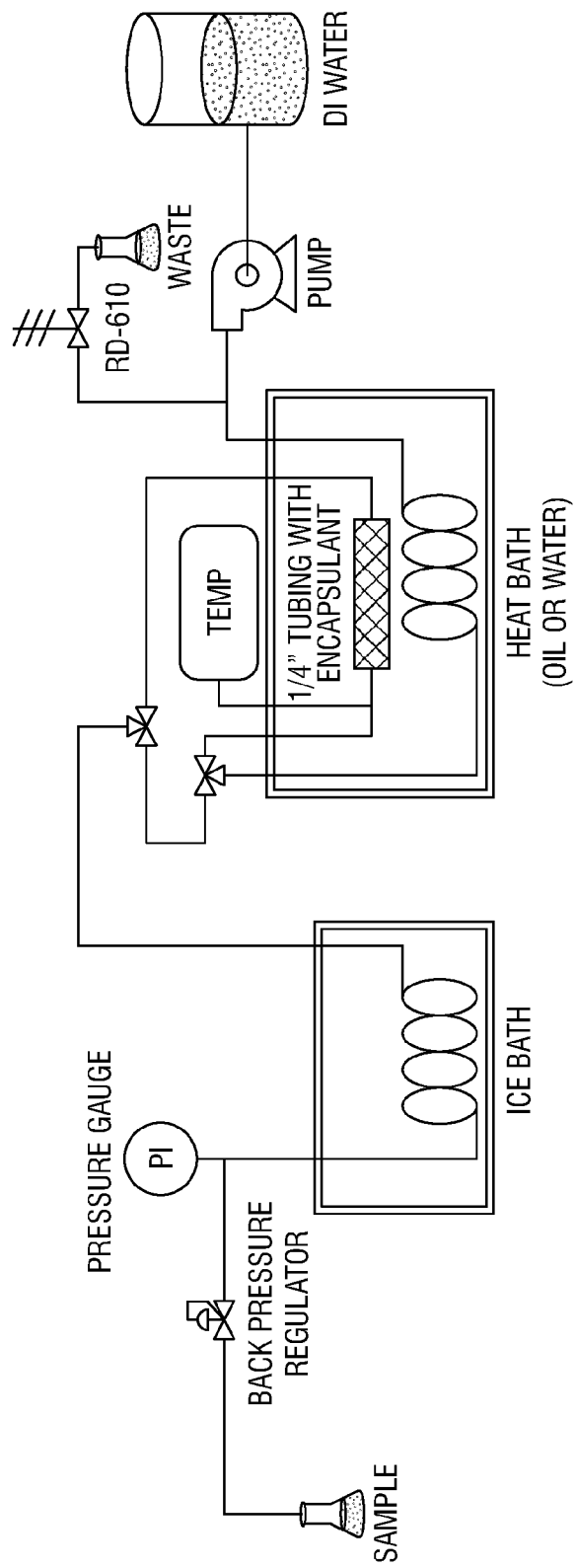
FIG. 3 represents the schematic of the Hydrostatic Pressure (HP) Release Profile Apparatus used in Example 2.

The Hydrostatic Pressure (HP) Release Profile Apparatus rated to 300° F. and 4,500 psi was used to determine the concentration of APS, the schematic shown in FIG. 3. In operation, DI water was pumped through a heating coil immersed in a water or oil bath. The fluid then entered a piece of ¼ inch tubing (sample holder) filled with glass wool on either end with encapsulated product in the middle. The glass wool kept the product in place. The flow continues out of the heated bath and through a cooling coil immersed in an ice-water bath. Finally, the fluid entered a Tescom regulator where the system pressure was controlled. Flow from the regulator was collected in 50 mL sample containers for later analysis of APS concentration. The bath temperature was internally controlled by a controller and was equipped with an over temperature dial for safety. A separate controller was used as an additional safety device and operated as an over temperature controller with a thermocouple placed in the flowing stream adjacent to the coil.

Figure 4:
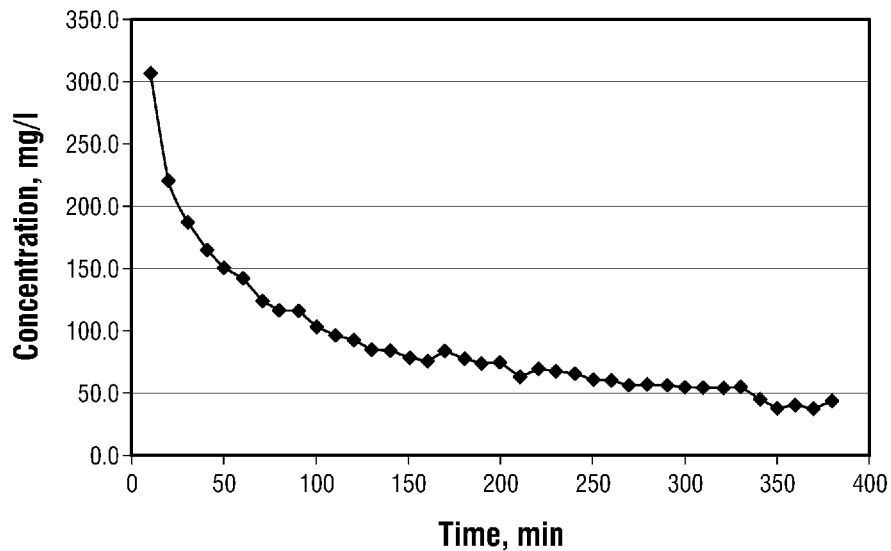
FIG. 4 represents the concentration of ammonium persulfate (APS) in Example 2 at 130° F. (54.4° C.).

A sample holder was packed with 0.5 grams of encapsulated APS and capped with glass wool. The bath temperature was set at 130° F. (54.4° C.). The system pressure was set at 3000 psi and the flow rate was maintained at 5 mL per minute. The test was run for about 6 hours, such that the concentration of APS in the eluted fluid is shown in FIG. 4.

Figure 5:
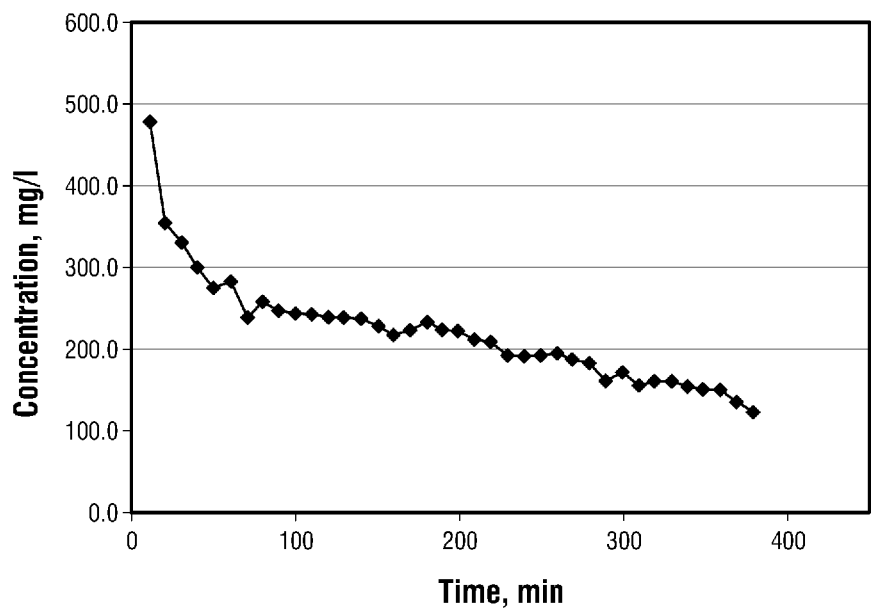
FIG. 5 represents the concentration of ammonium persulfate (APS) in Example 2 at 160° F. (71.1° C.).

An additional sample holder was packed with 0.5 grams of encapsulated APS and capped with glass wool. Bath temperature was set at 160° F. (71.1° C.). System pressure was set at 3000 psi and the flow rate was maintained at 5 mL per minute. The test was run for about 6 hours, such that the concentration of APS in the eluted fluid is shown in FIG. 5.

The foregoing disclosure and description is illustrative and explanatory thereof and it can be readily appreciated by those skilled in the art that various changes in the size, shape and materials, as well as in the details of the illustrated construction or combinations of the elements described herein can be made without departing from the spirit of the disclosure.

While the embodiments have been illustrated and described in detail in the drawings and foregoing description, the same is to be considered as illustrative and not restrictive in character, it being understood that only some embodiments have been shown and described and that all changes and modifications that come within the spirit of the applications are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Although only a few example embodiments have been described in detail above, those skilled in the art will readily appreciate that many modifications are possible in the example embodiments without materially departing from this application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for treating a subterranean formation penetrated by a wellbore, the method comprising:
   introducing a well treatment fluid comprised of at least an encapsulated biocide,
   wherein upon the introduction of the encapsulated biocide and after a predetermined period of time, a biocide is released from an encapsulation material and treats the wellbore and the subterranean formation, and
   wherein the well treatment fluid further comprises a non-encapsulated biocide, and the encapsulated biocide has a release profile such that the encapsulated biocide provides an initial concentration of biocide capable of:
      obtaining immediate control of microbial growth within the subterranean formation and the wellbore, and
      delaying release of the biocide for long term control of the microbial growth.

2. The method of claim 1, wherein the biocide is a non-oxidizing biocide or an oxidizing biocide.

3. The method of claim 2, wherein the oxidizing biocide is selected from the group consisting of hypochlorite bleach, peracetic acid, bromochlorodimethylhydantoin, dichloroethylmethylhydantoin, chloroisocyanurate, trichloroisocyanuric and dichloroisocyanuric acids and salts thereof, calcium hypochlorite, lithium hypochlorite, chlorinated hydantoins, sodium hypobromite, brominated hydantoins, chlorine dioxide, peroxides, persulfates and combinations thereof.

4. The method of claim 2, wherein the non-oxidizing biocide is selected from the group consisting of quaternary ammonium salts, quaternary phosphonium salts, isothiazolines, quaternary amine compounds, aldehydes and combinations thereof.

5. The method of claim 1, wherein the biocide has a solubility of about 0.2 to 2 g/L at a temperature of 20° C. and a pressure of 1 atm.

6. The method of claim 1, wherein the encapsulating material is primarily comprised of a solid matrix of inert material.

7. The method of claim 1, wherein the encapsulating material is selected from the group consisting of poly vinylidene chloride (PVdC), polyoxymethylene urea, melamine urea, acrylics, lipids, waxes, glass, gelatin, alginates and combinations thereof.

8. The method of claim 1, wherein the encapsulating material is a hydrophobic material selected from the group consisting of poly vinylidene chloride (PVdC), lipids, waxes and combinations thereof.

9. The method of claim 1, wherein the encapsulated biocide has a release profile such that the encapsulated biocide provides an initial concentration of biocide capable of:
   obtaining immediate control of microbial growth within the subterranean formation and the wellbore, and
   delaying release of the biocide for long term control of the microbial growth.

10. The method of claim 1, wherein the biocide is dichloroisocyanuric acid or trichloroisocyanuric acid, and the encapsulating material is poly vinylidene chloride (PVdC).

11. The method of claim 1, wherein the well treatment fluid further comprises a hydratable polymer selected from the group consisting of guar, hydropropyl guar (HPG), carboxymethyl guar (CMG), carboxymethylhydroxypropyl guar (CMHPG), cellulose, hydroxyethylcellulose (HEC), hydroxypropylcellulose (HPC), carboxymethylhydroxyethylcellulose (CMHEC), xanthan, diutan, whelan gum, polyacrylamide, copolymers or terpolymers containing acrylamide, acrylate, vinyl pyrrolidone, or acylamidopropane sulfonic acid, and polyacrylate polymers.

12. The method of claim 1, wherein the well treatment fluid further comprises at least one material selected from the group consisting of a breaker, a breaking aid, a surfactant, a proppant, a fiber, a friction reducer and an organoamino compound.

13. The method of claim 1, wherein the well treatment fluid further comprises a non-encapsulated biocide.

14. The method of claim 1, wherein the predetermined period of time is an amount greater than or equal to about 1 hour, 5 hours, 1 day, 2 days, 5 days, 1 week, 3 weeks, 1 month, 3 months, 6 months or 1 year.

15. A method for treating a subterranean formation penetrated by a wellbore, the method comprising:
    introducing a well treatment fluid comprised of at least an encapsulated biocide and a hydratable polymer,
    wherein upon the introduction of the encapsulated biocide and after a predetermined period of time, a biocide is released from an encapsulation material and treats the subterranean formation, and
    wherein the well treatment fluid further comprises a non-encapsulated biocide, and the encapsulated biocide has a release profile such that the encapsulated biocide provides an initial concentration of biocide capable of:
       obtaining immediate control of microbial growth within the subterranean formation and the wellbore, and
       delaying release of the biocide for long term control of the microbial growth.

16. The method of claim 15, wherein the biocide is a non-oxidizing biocide or an oxidizing biocide.

17. The method of claim 16, wherein the oxidizing biocide is selected from the group consisting of hypochlorite bleach, peracetic acid, bromochlorodimethylhydantoin, dichloroethylmethylhydantoin, chloroisocyanurate, trichloroisocyanuric and dichloroisocyanuric acids and salts thereof, calcium hypochlorite, lithium hypochlorite, chlorinated hydantoins, sodium hypobromite, brominated hydantoins, chlorine dioxide, peroxides, persulfates and combinations thereof.

18. The method of claim 16, wherein the non-oxidizing biocide is selected from the group consisting of quaternary ammonium salts, quaternary phosphonium salts, isothiazolines, aldehydes, quaternary amine compounds, and combinations thereof.

19. The method of claim 15, wherein the encapsulating material is selected from the group consisting of poly vinylidene chloride (PVdC), polyoxymethylene urea, melamine urea, acrylics, glass, lipids, waxes, gelatin, alginates and combinations thereof.

20. The method of claim 15, wherein the hydratable polymer is selected from the group consisting of guar, hydropropyl guar (HPG), carboxymethyl guar (CMG), carboxymethylhydroxypropyl guar, cellulose, hydroxyethylcellulose (HEC), hydroxypropylcellulose (HPC), carboxymethylhydroxyethylcellulose (CMHEC), xanthan, diutan, whelan gum, polyacrylamide, or polyacrylate polymers.

21. The method of claim 15, wherein the well treatment fluid further comprises at least one material selected from the group consisting of a breaker, a breaking aid, a surfactant, a proppant, a fiber, a friction reducer and an organoamino compound.

22. A method for hydraulic fracturing a subterranean formation penetrated by a horizontal wellbore, the method comprising:
   isolating at least a portion of the horizontal wellbore, and
   introducing a well treatment fluid comprised of at least an encapsulated biocide and water,
   wherein upon the introduction of the encapsulated biocide and after a predetermined period of time, a biocide is released from an encapsulation material and treats the subterranean formation,
   wherein the well treatment fluid further comprises a non-encapsulated biocide, and the encapsulated biocide has a release profile such that the encapsulated biocide provides an initial concentration of biocide capable of:
   obtaining immediate control of microbial growth within the subterranean formation and the wellbore, and
   delaying release of the biocide for long term control of the microbial growth; and
   wherein the horizontal wellbore is not flowed back for about 1 day to about 1 year.

\* \* \* \* \*